United States Patent [19]

Deckers et al.

[11] Patent Number: 5,346,945
[45] Date of Patent: Sep. 13, 1994

[54] GLASS FIBER-REINFORCED STYRENE COPOLYMERS

[75] Inventors: Andreas Deckers, Ludwigshafen; Norbert Guentherberg, Speyer, both of Fed. Rep. of Germany

[73] Assignee: BASF Aktiengesellschaft, Ludwigshafen, Fed. Rep. of Germany

[21] Appl. No.: 110,216

[22] Filed: Aug. 23, 1993

[30] Foreign Application Priority Data

Aug. 27, 1992 [DE] Fed. Rep. of Germany ....... 4228571

[51] Int. Cl.$^5$ .......................... C08J 5/08; C08K 3/40; C08L 25/04
[52] U.S. Cl. .................................. 524/494; 525/227; 525/232; 525/205
[58] Field of Search ................ 524/494; 525/227, 232, 525/205

[56] References Cited

FOREIGN PATENT DOCUMENTS 00303919 6/1988 European Pat. Off. .

*Primary Examiner*—Paul R. Michl
*Assistant Examiner*—U. K. Rajguru
*Attorney, Agent, or Firm*—Keil & Weinkauf

[57] ABSTRACT

A thermoplastic molding material comprising (A) a copolymer composed of acrylonitrile plus styrene, a-methylstyrene or a nuclear-substituted styrene derivative or mixtures of these three monomers; (B) a graft copolymer prepared either by ($B_1$) emulsion polymerization of a monomer mixture, based on either styreneacrylonitrile or styreneacrylonitrile-methyl methacrylate, on a latex, obtained as an emulsion, of an elastomer based on butadiene or acrylic ester as a grafting base, or by ($B_2$) solution polymerization of a monomer mixture, based on either styreneacrylonitrile or styreneacrylonitrile-methyl methacrylate, on an elastomer, prepared in solution, based on butadiene or acrylic ester or an EPDM elastomer as grafting base; (C) a. reinforcing agent based on an inorganic glass; and (D) a copolymer composed of ($D_1$) units of the formula I,

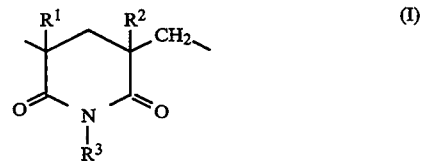

in which $R^1$ and $R^2$ are hydrogen or methyl and $R^3$ is hydrogen, $C_1$-$C_8$alkyl, $C_5$-$C_{12}$cycloalkyl, $C_6$-$C_{16}$aryl or $C_1$-$C_{14}$aralkyl, and ($D_2$) units derived from a copolymerizable monomer selected from styrene, α-methylstyrene, (meth)acrylonitrile or (meth)acrylic acid esters.

2 Claims, No Drawings

GLASS FIBER-REINFORCED STYRENE COPOLYMERS

As with all glass fiber-reinforced thermoplastics, with glass fiber-reinforced styrene copolymers, too, a permanent bond must be formed between the organic polymers and the (inorganic-polar) glass surface.

This is achieved in particular by adding an adhesion promoter that has a certain affinity on the one hand for the organic synthetic resin and on the other for the glass surface.

EP-A1-303 919 proposes, as adhesion promoters, copolymers of styrene, acrylonitrile and maleic anhydride. The synthetic resin is a styrene-acrylonitrile (SAN) copolymer.

These adhesion promoters have a disadvantage however; the corresponding mixtures are difficult to process under the normal conditions, i.e. particularly during injection molding.

We have found that certain (meth)acrylimide copolymers are outstandingly suitable as adhesion promoters for glass fiber-reinforced styrene-acrylonitrile copolymers.

The immediate subject matter of the invention is accordingly a thermoplastic molding material comprising, based on the sum of A, B, C and D, A: 30 to 95% (preferably 35 to 90%) by weight of a copolymer A comprising, in each case, based on A
 - $a_1$: 50 to 95% (preferably 55 to 90%, in particular 60 to 80%) by weight of styrene, α-methylstyrene, a nuclear-substituted styrene derivative or mixtures of these monomers ($a_1$) and
 - $a_2$: 5 to 50% (preferably 10 to 45%, in particular 20 to 40%) by weight of acrylonitrile ($a_2$) up to 60% (preferably 4 to 50%) by weight of a graft copolymer B
  - $b_1$: prepared either by emulsion polymerization of, based on B, 15 to 85% (preferably 20 to 75%, in particular 30 to 70%) by weight of a monomer mixture based either on
  - $b_{11}$: styrene-acrylonitrile in the ratio 9:1 to 4:6, or
  - $b_{12}$: styrene-acrylonitrile-methyl methacrylate in the ratio 19:1:0 to 8:6:6 on 15 to 85% (preferably 20 to 75%, in particular 30 to 70%) by weight of a latex, obtained as an emulsion, of an elastomer based on butadiene or acrylic ester as grafting base; or by
  - $b_2$: solution polymerization of, based on B, 15 to 85% (preferably 20 to 75%, in particular 30 to 70%) by weight of a monomer mixture based on
  - $b_{21}$: styrene-acrylonitrile in the ratio 9:1 to 4:6 or
  - $b_{22}$: styrene-acrylonitrile-methyl methacrylate in the ratio 19:1:1 to 8:6:6 on 15 to 85% (preferably 20 to 75%, in particular 30 to 70%) by weight of an elastomer, prepared in solution, based on butadiene or an acrylic ester or an EPDM elastomer as grafting base;

C: 1 to 40% (preferably 5 to 35%) by weight of a reinforcing agent C based on an inorganic glass, and also D: 0.1 to 10% (preferably 1.5 to 10%, in particular 3 to 10%) by weight of a copolymer D of, based on B,
 - $d_1$: 10 to 90% (preferably 25 to 90%, in particular 30 to 89%) by weight of units of the formula I

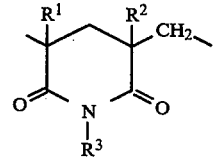

in which $R^1$ and $R^2$ are hydrogen or methyl and $R^3$ is hydrogen, $C_1$–$C_8$alkyl, $C_5$–$C_{12}$cycloalkyl or $C_6$–$C_{16}$aryl or $C_6$–$C_{16}$aralkyl, and
 - $d_2$: 10 to 90% (preferably 10 to 75%, in particular 11 to 70%) by weight of units derived from a copolymerizable monomer selected from styrene, α-methylstyrene, (meth)acrylonitrile or (meth)acrylic acid esters, with the proviso that the acid number S of the copolymer D is at least 0.5 meq/g.

The molding materials according to the invention may in addition contain up to 20 parts by weight, based on 100 parts by weight of the constituents A to D, of conventional additives such as stabilizers, antioxidants, antistatics, flow improvers, mold release agents, dyes, pigments or flameproofing agents. Suitable flameproofing agents are for example from the class of halogenated, preferably brominated, low molecular or high molecular compounds such as aromatic compounds, aryl ethers, aralkyl ethers, arylamides, arylanhydrides, phenols, aralkylimides and aryl siloxanes. Additives which are also useful in many cases are polyesters, for example polyethylene or polybutylene terephthalate.

The adhesion promoter D according to the invention is preferably contained in an amount of from 1.5 to 10% by weight, and particularly preferably in an amount of from 3 to 10% by weight, in the molding materials.

Component A

As component A of the molding materials according to the invention, styrene-(meth)acrylonitrile copolymers, styrene-methyl (meth) acrylate copolymers or copolymers of styrene, methyl methacrylate and (meth) acrylonitrile are used; these essentially comprise copolymers that contain incorporated by polymerization, 5 to 50% by weight, in particular 20 to 40% by weight, of (meth)acrylonitrile and/or methyl (meth) acrylate, preferably acrylonitrile and/or methyl methacrylate as monomer $a_2$ and 50 to 95% by weight, in particular 60 to 80% by weight, of styrene as monomer $a_1$. In order to improve the heat resistance, the styrene constituent may be replaced wholly or partially by α-methylstyrene or nuclear alkylated styrene, in particular α-methylstyrene. The particularly preferred styrene-acrylonitrile copolymers that are used are also commercially obtainable and may be prepared for example according to DE-B-1 001 001 and DE-C-1 003 436. The molecular weight range of the copolymers may be from 80,000 to 500,000 (weight average value $M_w$, measured for example from light scattering experiments).

Component B

The component B is formed from graft copolymers, which are used as required. These graft copolymers are built up, in each case, based on B, from 15 to 85% by weight of a mixture of styrene and acrylonitrile, and if desired methyl methacrylate as further copolymer, in a ratio of 9:1 to 4:6 as graft sheath, and 15 to 85% by weight of an elastomeric grafting base (rubber component) based on a homopolymer or copolymer of butadiene or acrylic ester. If methyl methacrylate is also used, the ratio S:A:MMA is in general between 19:1:0 and 8:6:6.

The preparation of the graft copolymers B is known, and they may be prepared by polymerizing a mixture of for example styrene and acrylonitrile and/or methacrylonitrile in the presence of a rubber.

The rubber should have a glass transition temperature (according to K. H. Illers and H. Breuer, Kolloid-Zeitschrift 137 (1961), p. 110) that is below 0° C., preferably below −30° C. Suitable rubbers are for example: polybutadiene (cf. DE-A-1 420 775 and DE-A-1 495 089); copolymers of butadiene and styrene (cf. GB-B 649 166); polyacrylic acid esters (of. DE-B-1 260 135) and also copolymers of acrylic acid esters and butadiene (cf. DE-B-1 238 207); and furthermore elastomers based on copolymers of acrylic acid esters with styrene, acrylonitrile and vinyl ethers.

Apart from styrene there may be used, in a known manner, α-methylstyrene and/or nuclear alkylated styrenes having up to 12 carbon atoms, and as monomeric (meth)acrylic acid alkyl esters there may be used $C_1$-$C_8$ alkyl esters and also methacrylonitrile instead of acrylonitrile or mixtures thereof.

The graft copolymerization may be performed in a known manner in solution, suspension or, preferably, in emulsion. The soft phase of the graft copolymer has, in the case of the preferred preparation of the rubber and the grafting in emulsion, a median particle diameter ($d_{50}$ value of the cumulative weight distribution) of 0.08 μm. As a rule, after the enlargement (know per se) of the particles, for example by agglomeration, the $d_{50}$ value is in the range 0.1 to 0.6 μm. With such graft copolymerization an at least partial chemical coupling of the polymerizable monomers with the prepolymerized rubber takes place, the coupling presumably occurring at the double bonds contained in the rubber. At least some of the monomers are thus grafted onto the rubber.

Those monomers which are not grafted onto the rubber copolymerize by themselves. This copolymer can be counted as the component A in the case of the mixtures under discussion here. The proportion of the grafted monomers can be determined by measuring the gel content of the graft copolymers.

The graft copolymer is dissolved in a solvent, for example in methyl ethyl ketone. Only the ungrafted monomers, which have copolymerized by themselves, dissolve. This constituent, if present, is not responsible for the impact resistance of the molding material according to the invention.

Component C

The molding material according to the invention contains customary reinforcing agents such as glass fibers, glass balls, mineral fibers, aluminum oxide fibers, mica, quartz powder, wollastonite, etc. Particularly preferred are glass fiber-reinforced molding materials, in which arrangement the glass fibers can be present as short glass fibers having a mean length of from 0.05 to 0.5 mm or in granulate length (glass fiber length of from 2.0 to 10 nun).

The glass fibers used may be of E, A or C glass. They have preferably been treated with a size and a coupling agent, and their diameter is generally in the range from 6 to 20 μm, preferably from 3 to 6 μm.

Component D

The preferred units of the formula (I) are those in which $R^1$ and $R^2$ are identical. This corresponds to polymers that have essentially been built up from monomer units of acrylic acid esters or methacrylic acid esters and have then been imidated.

Preferred radicals $R^3$ are, in addition to hydrogen, and especially alkyl groups, in particular methyl or a cyclohexyl group. Preferred aryl radicals are phenyl and also those that contain 1 to 4 methylene groups as bridging member between the N atom and the aromatic radical, in particular benzyl.

The copolymers D can be prepared according to the processes described in US-A-4 246 374 and EP 234 726, ie. by polymer-like conversion of for example polymethyl methacrylate with suitable primary amines $R^3NH_2$ or with ammonia to form the corresponding polymethacrylimide:

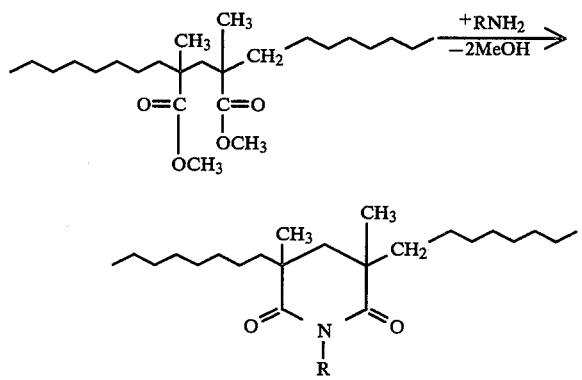

Particularly suitable amines are the compounds described in DE-A 4 142 575.

According to the invention, the copolymers D which are suitable have a relatively high acid number S, namely at least 0.5 meg/g, preferably at least 0.6 meq/g.

This acid number is determined in a manner known per se by determining the lye-titratable acid equivalents in a solution of the polymer.

To this end, 0.3 g of polymer are dissolved in 75 ml of a mixture of equal parts by volume of dichloromethane and methanol, and the mixture is treated with excess 0.1 N sodium hydroxide solution, which is then back-titrated potentiometrically with 0.1 N of hydrochloric acid. If necessary, the result is corrected by the solvent blank value.

The acid number is then calculated as the content of acid in equivalents per kilogram of imidizable polymer.

Component E

The molding material according to the invention may contain as component E additives that are typical and conventional for SAN polymers and graft copolymers based on ABS, ASA, etc. or mixtures thereof. As such additives there may be mentioned, for example, fillers and also materials to improve the screening effect against electromagnetic waves (for example metal flakes, metal powders, metal fibers, metal-coated fillers), dyes, pigments, antistatics, antioxidants, stabilizers, and also flameproofing agents and in particular the lubricants that are necessary for the further processing of the molding material, for example in the production of molded articles and molded parts. Of the lubricants, there may be mentioned in particular those based on N,N'-distearylethylenediamine (acra wax), which are preferably used in order to maintain the processing properties of the molding materials at a high level. Silicone oils, polyglycols and stearates are also suitable.

The molding material according to the invention may be processed by thermoplastic processing methods known per se, for example by extrusion, injection molding, calendering, blow molding, compression molding or sintering. Particularly preferably, molded parts for the automobile industry are produced by injection molding from the molding materials prepared by the process according to the invention.

The molding materials according to the invention may be used for electrical equipment housings and cabinets, domestic appliances, telephones, sheets, pipes and in motor vehicle construction.

Testing

The property parameters used in the following examples are determined as follows:

Impact strength $a_n$ or $a_{n\,2}$ [kJ/m$^2$] according to DIN 53 453 on small standard specimens injection molded at 250° C.

Modulus of elasticity [N/mm$^2$] according to DIN 53 457 on a tensile specimen according to ISO 3167

Tensile stress at break [N/mm$^2$] according to DIN 53 455 on a tensile specimen according to ISO 3167

The following individual constituents were used for the subsequent tests:

Component A:

SAN copolymer containing 35% acrylonitrile, 65% styrene VN=80 ml/g

Component B:

B-1 E rubber component comprising 60% polybutadiene, 15% acrylonitrile and 25% styrene B-2 E rubber component comprising 60% poly-n-butyl acrylate (crosslinked with 2% by weight of DCPA), 15% acrylonitrile and 25% styrene Component C:

E glass fibers (rovings)
Fiber diameter 10 μm (product OCF 429)

Component D:

D-1:
Polymethacrylimide prepared by reacting a copolymer comprising 99% by weight MMA and 1% by weight MA (methacrylic acid) with cyclohexylamine according to U.S. Pat. No. 4 246 374
Imide content=47%; VN=50
Acid number=0.94 meq/g D-2:
Polymethacrylimide (Kamax T 170; Rohm & Haas) where $R^3 = CH_3$
Imide content =87%; VN =57
Acid number =0.67 meq/g D-3:
Polymethacrylimide prepared by reacting a copolymer comprising 99% by weight MMA and 1% by weight MA with cyclohexylamine (see above) and subsequently re-esterifing the free acid groups using trimethyl orthoformate as described in EP 216 505 (for comparison)
Imide content =62%; VN =67
Acid number =0.1 meq/g D-4:
Polymethacrylimide (Paraloid EXL 4241; Rohm & Haas), where $R^3 = CH_3$ (for comparison)
Imide content=74%; VN=82
Acid number=0.02 meq/g

| Ex. No Comp. No | SAN (A) | B-1 | B-2 | GF | D | Modulus of elasticity [N/mm$^2$] | Tensile stress at break [N/mm$^2$] | $a_k$ (20° C.) [kJ/m$^2$] | $a_{k2}$ (−40° C.) [kJ/m$^2$] |
|---|---|---|---|---|---|---|---|---|---|
| | | [% by weight] | | | | | | | |
| 1 | 65 | 15 | — | 16 | 4(D-1) | 6295 | 97 | 18.1 | 18.0 |
| 2 | 61 | 15 | — | 16 | 8(D-2) | 6320 | 103 | 20.4 | 19.9 |
| 3 | 65 | 15 | — | 16 | 4(D-2) | 6340 | 96 | 19.3 | 17.6 |
| 4 | 61 | — | 18 | 16 | 5(D-2) | 6320 | 98 | 20.2 | 19.5 |
| C1 | 69 | 15 | — | 16 | — | 6070 | 74 | 12.3 | 14.6 |
| C2 | 65 | 15 | — | 16 | 4(D-3) | 6110 | 77 | 14.1 | 12.2 |
| C3 | 65 | 15 | — | 16 | 4(D-4) | 6090 | 71 | 10.2 | 11.9 |
| C4 | 66 | — | 18 | 16 | — | 6100 | 85 | 14.5 | 15.6 |

SAN = Styrene/acrylonitrile copolymer A
GF = Glass fiber C

We claim:

1. A thermoplastic molding material comprising, based on the sum of A, B, C and D,
A: 30 to 95% by weight of a copolymer A comprising, in each case, based on A
   $a_1$: 50 to 95% by weight of styrene, α-methylstyrene, a nuclear-substituted styrene derivative or mixtures of these monomers ($a_1$) and
   $a_2$: 5 to 50% by weight of acrylonitrile ($a_2$)
B: up to 60% by weight of a graft copolymer B
   $b_1$: prepared either by emulsion polymerization of, based on B, 15 to 85% by weight of a monomer mixture based either on
   $b_{11}$: styrene-acrylonitrile in the ratio 9:1 to 4:6, or
   $b_{12}$: styrene-acrylonitrile-methyl methacrylate in the ratio 19:1:0 to 8:6:6 on 15 to 85% by weight of a latex, obtained as an emulsion, of an elastomer based on butadiene or acrylic ester as grafting base; or by
   $b_2$: solution polymerization of, based on B, 15 to 85% by weight of a monomer mixture based on
   $b_{21}$: styrene-acrylonitrile in the ratio 9:1 to 4:6 or
   $b_{22}$: styrene-acrylonitrile-methyl methacrylate in the ratio 19:1:1 to 8:6:6 on 15 to 85% by weight of an elastomer, prepared in solution, based on butadiene or an acrylic ester or an EPDM elastomer as grafting base;
C: 1 to 40% by weight of a reinforcing agent C based on an inorganic glass, and also
D: 0.1 to 10% by weight of a copolymer D of, based on B,
   $d_1$: 10 to 90% by weight of units of the formula I

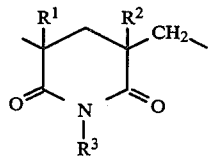

(I)

in which $R^1$ and $R^2$ are hydrogen or methyl and $R^3$ is hydrogen, $C_1$–$C_8$alkyl, $C_5$–$C_{12}$-cycloalkyl or $C_6$–$C_{16}$aryl or $C_6$–$C_{16}$aralkyl, and $d_2$: 10 to 90% by weight of units derived from a copolymerizable monomer selected from styrene, α-methylstyrene, (meth) acrylonitrile or (meth)acrylic acid esters, with the proviso that the acid number S of the copolymer D is at least 0.5 meq/g..

2. A method of using the molding material as claimed in claim 1 for producing molded articles.

* * * * *

UNITED STATES PATENT AND TRADEMARK OFFICE
CERTIFICATE OF CORRECTION

PATENT NO. : 5,346,945
DATED : September 13, 1994
INVENTOR(S) : Deckers et al.

It is certified that error appears in the above-indentified patent and that said Letters Patent is hereby corrected as shown below:

Column 8, claim 1, line 2, "$C_5$-$C_{12}$2-cycloalkyl" should read --$C_5$-$C_{12}$cycloalkyl--.

Signed and Sealed this

Twenty-ninth Day of November, 1994

Attest:

BRUCE LEHMAN

*Attesting Officer*   *Commissioner of Patents and Trademarks*